US009388780B2

(12) United States Patent
Oikawa et al.

(10) Patent No.: US 9,388,780 B2
(45) Date of Patent: Jul. 12, 2016

(54) FUEL SUPPLY DEVICE

(71) Applicant: DENSO CORPORATION, Kariya, Aichi-pref. (JP)

(72) Inventors: Shinobu Oikawa, Kariya (JP); Tetsuro Okazono, Okazaki (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 14/250,961

(22) Filed: Apr. 11, 2014

(65) Prior Publication Data

US 2014/0360602 A1 Dec. 11, 2014

(30) Foreign Application Priority Data

Jun. 7, 2013 (JP) ................................ 2013-121144

(51) Int. Cl.

*B01D 47/00* (2006.01)
*F02M 37/10* (2006.01)
*F02M 37/00* (2006.01)

(52) U.S. Cl.

CPC ......... *F02M 37/103* (2013.01); *F02M 37/0082* (2013.01); *Y10T 137/86035* (2015.04)

(58) Field of Classification Search

CPC .. F02M 37/103; F02M 37/106; B01D 35/027
USPC ........... 137/565.24, 565.17; 29/428; 417/360; 123/509
See application file for complete search history.

(56) References Cited

U.S. PATENT DOCUMENTS

| | | | | |
|---|---|---|---|---|
| 2004/0163630 | A1* | 8/2004 | Powell | 123/509 |
| 2010/0200595 | A1* | 8/2010 | Malec | F02M 37/103 220/567.2 |
| 2012/0060948 | A1* | 3/2012 | Okazono et al. | 137/565.17 |
| 2012/0240901 | A1* | 9/2012 | Yamada et al. | 123/509 |

FOREIGN PATENT DOCUMENTS

| | | |
|---|---|---|
| JP | 2008-174230 | 7/2008 |

* cited by examiner

*Primary Examiner* — Jessica Cahill
*Assistant Examiner* — Angelisa L Hicks
(74) *Attorney, Agent, or Firm* — Nixon & Vanderhye P.C.

(57) ABSTRACT

A resilient member is accommodated within a single support column, which connects a flange and a pump unit. The resilient member presses the pump unit in an axial direction toward a bottom part of a fuel tank through a holder member. The support column is formed in a polygonal tube shape and has a specific range in a part in the axial direction. A peripheral wall in the specific range is concave relative to corner parts of peripheral walls in an outside of the specific range so that a longitudinal groove having a groove bottom is provided to separate an inside and an outside of the support column. The holder member holding the pump unit is formed in a polygonal hole shape to be fitted with the peripheral walls. The holder member has a slide protrusion, which slidingly moves in the longitudinal groove in a state that the holder member is pushed into the longitudinal groove from the outside of the support column.

6 Claims, 12 Drawing Sheets

FUEL SUPPLY DEVICE

CROSS REFERENCE TO RELATED APPLICATION

This application is based on and incorporates herein by reference Japanese patent application No. 2013-121144 filed on Jun. 7, 2013.

FIELD

The present disclosure relates to a fuel supply device, which supplies fuel from an inside of a fuel tank of a vehicle to an outside of the fuel tank.

BACKGROUND

In a conventional fuel supply device for a vehicle, a flange fitted on a fuel tank and a pump unit disposed inside the fuel tank for discharging fuel to an outside of the fuel tank are linked together via a single support column.

According to the fuel supply device disclosed in JP-A-2012-828151 (US 2012/0060948 A1), for example, the support column extending from the flange is linked with a holder member, which holds the pump unit, relatively movably in an axial direction and accommodates therein a resilient member. The pump unit is biased in the axial direction toward a bottom of the fuel tank by the resilient member disposed in the support column and is located in position in the axial direction relative to the bottom of the fuel tank.

In this fuel supply device, the support column and the holder member are linked via an intermediate member. Specifically, the intermediate member is coupled to the support column with a predetermined angle relative to the support column and slidably fitted relative to the holder member. Thus the holder member is allowed to move relatively to the support column within a specified range in the axial direction but restricted from moving in a peripheral direction. Owing to the intermediate member, the pump unit is not only located in position in the axial direction with the biasing force but also located in position in the peripheral direction in accordance with an angle of linking between the support column and the intermediate member.

As a result of study on the fuel supply device described above, it is found that the intermediate member interferes with the resilient member in the support column and tends to impede positioning of the pump unit in the direction of an axis of the support column. Specifically, the intermediate member has an inner cylindrical part, which is inserted on an outer peripheral part of the resilient member in the support column. The inner cylindrical part is snap-fitted to the support column via coupling nails. These coupling nails tend to dislocate toward the inner side of the support column due to resilient deformation, which is caused by vibration of a vehicle, and interfere with the resilient member in the support column. With this interference, the resilient member varies its force of biasing the pump unit and becomes unable to provide desired function of positioning in the axial direction.

SUMMARY

It is therefore an object to provide a fuel supply device, which ensures a function of good positioning of a pump unit.

According to one aspect, a fuel supply device comprises, a flange mounted on a fuel tank of a vehicle, a pump unit disposed in the fuel tank for discharging fuel toward an outside of the fuel tank, a holder member holding the pump unit, a single support column extending from the flange and connecting the flange and the pump unit, the single support column being movable relative to the holder member in an axial direction, and a resilient member accommodated in the support column and pressing the pump unit toward a bottom part of the fuel tank in the axial direction through the holder member.

The support column is formed in a polygonal tube shape having a specific range partly in the axial direction and has a first peripheral wall and a second peripheral wall. The first peripheral wall is formed with corner parts in an outside of the specific range and a second peripheral wall formed in an inside of the specific range. The second peripheral wall is concave to form a longitudinal groove having a groove bottom for separating an inside and an outside of the support column in a radial direction.

The holder member is formed to have a polygonal hole shape to be fitted with at least one of the first peripheral wall and the second peripheral wall. The holder member has an accommodation hole and a slide protrusion. The accommodation hole accommodates the support column relatively movably in the axial direction. The slide protrusion is movable to slide in the longitudinal groove in a state of entering from an outside of the support column into the longitudinal groove.

DETAILED DESCRIPTION OF EMBODIMENT

Figure 1:
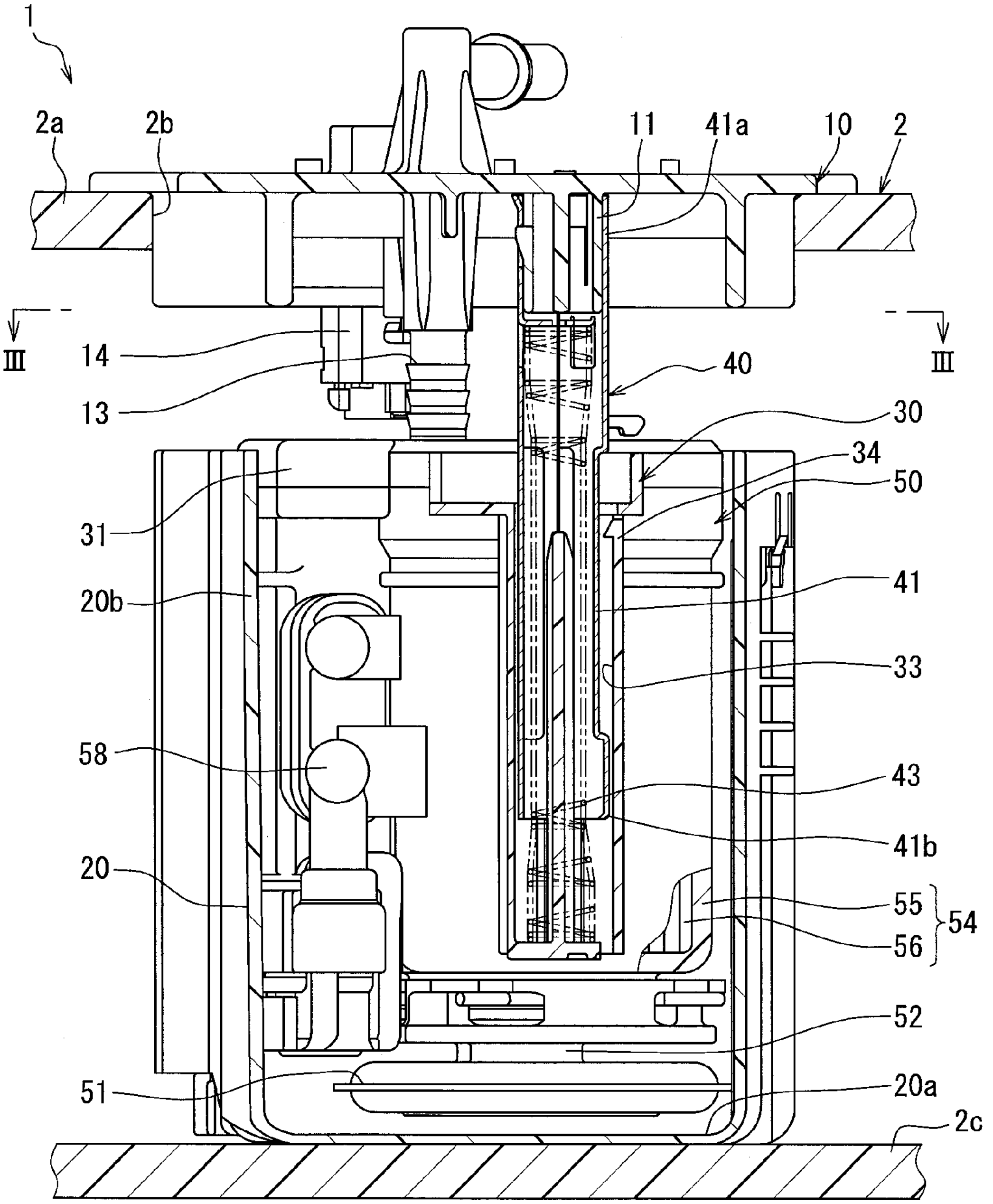
FIG. 1 is a sectional view of a fuel supply device according to a first embodiment, which is taken along a line I-I in FIG. 2.

A fuel supply device will be described with reference to plural embodiments shown in the drawings. In each embodiment, corresponding structural parts are designated with the same reference numerals thereby to simplify description thereof.

First Embodiment

Referring to FIG. 1, a fuel supply device 1 is mounted in a fuel tank 2 of a vehicle. The fuel supply device 1 supplies fuel from an inside of the fuel tank 2 to an internal combustion engine (not shown) provided outside the fuel tank 2. An up-down direction in FIG. 1 showing a state of mounting of the fuel supply device 1 in the fuel tank 2 is generally in correspondence to a vertical direction of a vehicle on a horizontal plane.

(Basic Structure)

Figure 2:
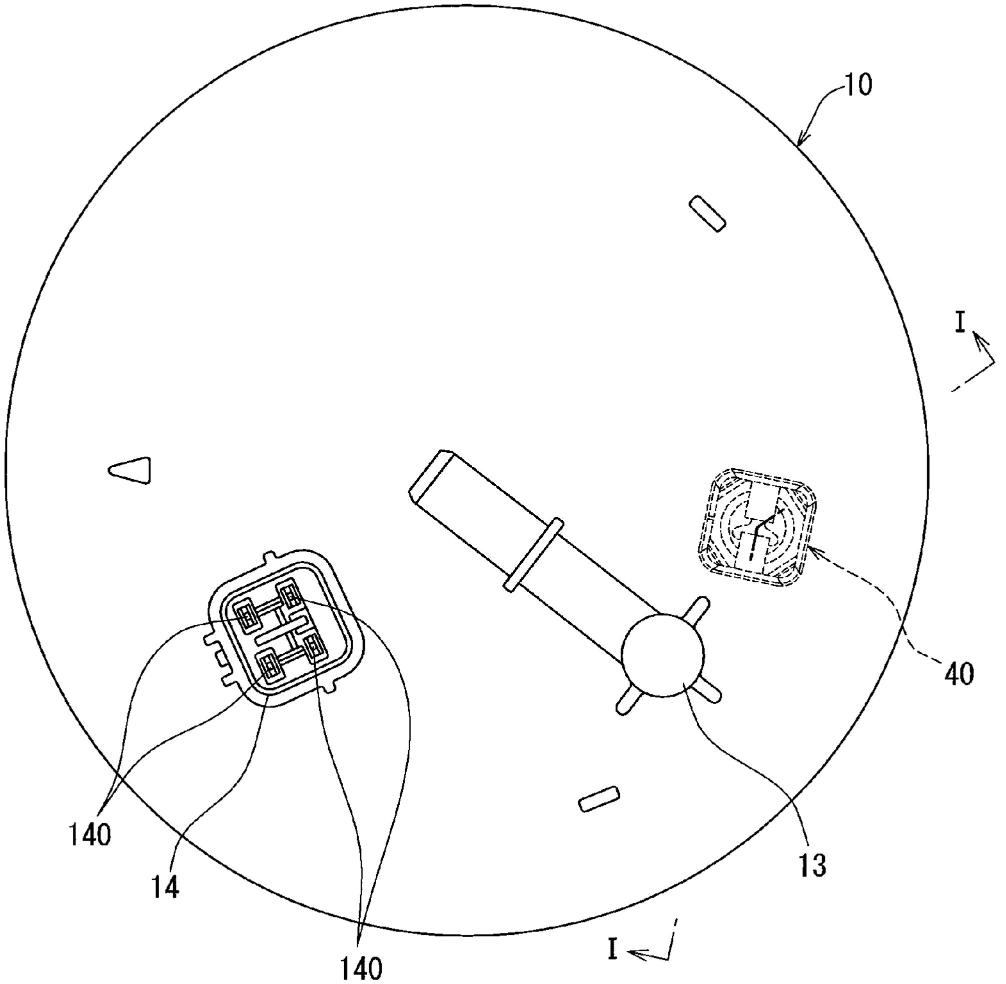
FIG. 2 is a top plan view of the fuel supply device shown in FIG. 1.
Figure 3:
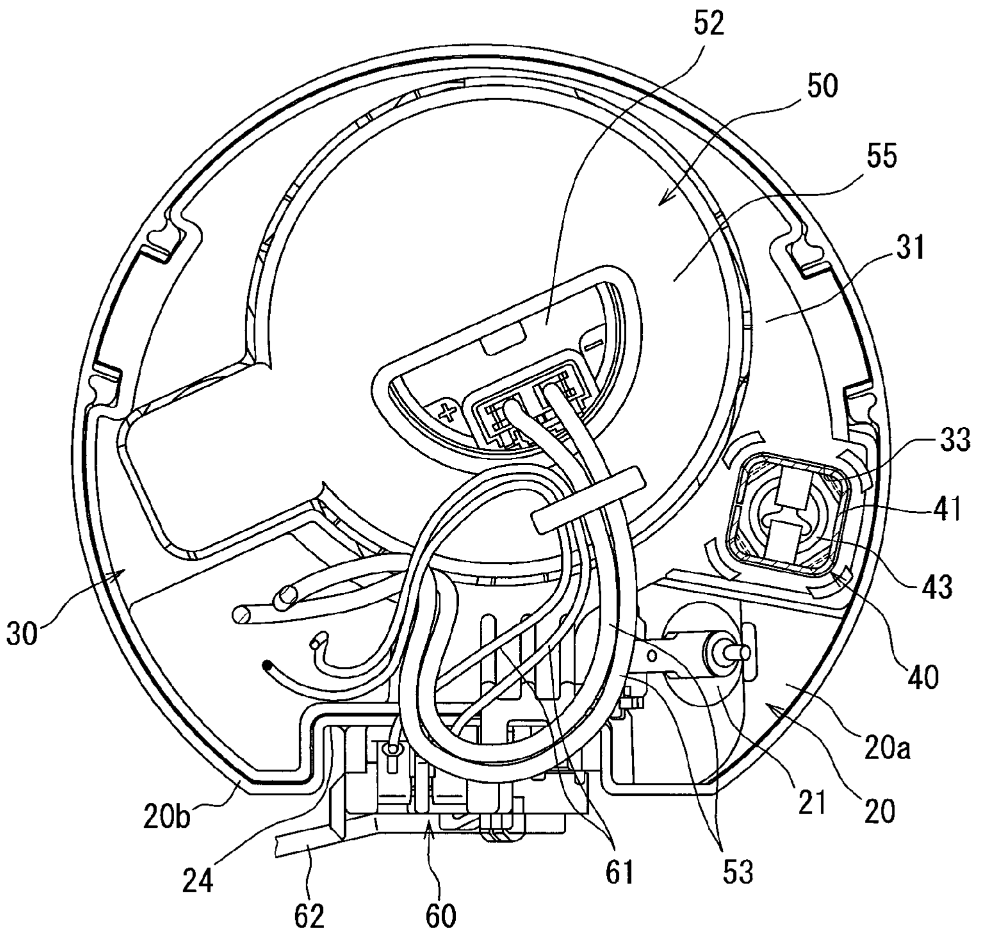
FIG. 3 is a top plan view of the fuel supply device, which is taken along a line in FIG. 1.

Basic structure of the fuel supply device 1 will be described first. As shown in FIG. 1 to FIG. 3, the fuel supply device 1 includes a flange 10, a sub-tank 20, a holder member 30, an adjusting mechanism 40, a pump unit 50 and a residual level detector 60. Structural components 20, 30, 40, 50 and 60 of the fuel supply device 1 other than the flange 10 are accommodated within the fuel tank 2.

As shown in FIG. 1 and FIG. 2, the flange 10 is formed of resin and in a disk shape. The flange 10 is firmly fitted in a through hole 2*b*, which passes a top plate part 2*a* of the fuel tank 2 made of resin, to close the hole 2*b*. The flange 10 has a fixing cylindrical part 11, a fuel supply pipe 13 and an electric connector 14. The fixing cylindrical part 11 protrudes downward. The fuel supply pipe 13 protrudes upward and downward. The fuel supply pipe 13 supplies fuel, which is discharged from the pump unit 50, to an outside of the fuel tank 2. The electric connector 14 houses therein metallic terminals 140, which electrically connect the pump unit 50 and the residual level detector 60. With those terminals 140, driving of a fuel pump 52 of the pump unit 50 is controlled from an outside through the electric connector 14 and a detection signal of the residual level detector 60 is outputted to the outside of the fuel tank 2 through the electric connector 14.

As shown in FIG. 1 and FIG. 3, the sub-tank 20 is formed of resin and in a bottomed-cylindrical shape. The sub-tank 20 is mounted on a bottom part 2*c* of the fuel tank 2. The sub-tank 20 has a jet pump 21, which is provided on a bottom part 20*a*, and a holder part 24, which holds the residual level detector 60 at its side part 20*b*. The jet pump 21 generates vacuum by ejecting excess fuel discharged from a pressure regulator 58 of the pump unit 50 and feeds fuel in the fuel tank 2 to the sub-tank 20. The sub-tank 20 stores the fuel, which is thus fed.

The holder member 30 is formed of resin and disposed in a ring plate shape. An outer peripheral part of the holder member 30 is firmly and coaxially fitted with an open peripheral part of the sub-tank 20. The holder member 30, which is fitted as described above, covers an opening of the sub-tank 20 within the fuel tank 2. The holder member 30 has a holder part 31, which holds the pump unit 50, and an accommodation hole 33, which accommodates a support column 41 of the adjusting mechanism 40.

The adjusting mechanism 40 has the support column 41, which extends an up-down direction, and a resilient member 43. The support column 41 is formed of a metal plate and in a polygonal tube shape. The support column 41 is fitted on an outer polygonal tube shape of a fixing tubular part 11 from its top end 41*a* side. The support column 41 thus longitudinally protrudes downward in the axial direction from the flange 10. The support column 41 is press-inserted into the accommodation hole 33, which is formed in a polygonal hole shape, from its bottom end 41*b* side. The support column 41 is thus linked with the holder member 30 to be relatively movable in the axial direction. According to the structure described above, the structural parts 20, 50, 60, which are integrated by the holder member 30, and the flange 10 are linked by only the single support column 41.

The resilient member 43 is formed of a metal coil spring and accommodated within the support column 41 coaxially. The resilient member 43 is interposed between the support column 41 and the accommodation hole 33 in the axial direction. According to this arrangement, the resilient member 43 presses down an assembly of the structural parts 20, 50 and 60, which is integrated by the holder member 30, toward the bottom part 2*c* of the fuel tank 2 in the axial direction. The structural parts 20, 50 and 60, which are pressed by the holder member 30, are pressed so that its bottom part 20*a* contacts the bottom part 2*c* in spite of design specifications, manufacturing tolerances, deformation and the like of the fuel tank 2. The structural parts 20, 50 and 60 are thus located in position in the axial direction relative to the bottom part 2*c*.

The pump unit 50 is accommodated within the sub-tank 20 except for its upper part, which is fitted through the holder part 31. As shown in FIG. 1, the pump unit 50 has a suction filter 51 and a fuel filter 54 in addition to the fuel pump 52 and the pressure regulator 58.

The suction filter 51 is located at the lowermost part in the pump unit 50. The suction filter 51 is connected to a suction side of the fuel pump 52 to remove large foreign materials in the fuel, which is suctioned from the inside of the sub-tank 20 to the fuel pump 52.

The fuel pump 52 is located on the upper side of the suction filter 51 in the pump unit 50. As shown in FIG. 3, the fuel pump 52 is an electrically-driven pump and electrically connected to the terminals 140 via flexible wires 53, which are freely curved. The fuel pump 52 is operable under control from an external side to be driven to pressurize the fuel suctioned through the suction filter 51.

As shown in FIG. 1, the fuel filter 54 is located around the fuel pump 52 in the pump unit 50. The fuel filter 54 accommodates a filter element 56 within a fuel case 55. The fuel case 55 is firmly fitted with the inner peripheral part of the holder part 31 and connected to a discharge side of the fuel pump 52. The fuel case 55 provides a space for accommodating the filter element 56 therein along the outer peripheral part of the fuel pump 52. The filter element 56 is formed of a honeycomb filtering material, for example, to remove small foreign materials in the fuel discharged from the fuel pump 52 to the inside of the fuel case 55. The fuel passing through the filter element 56 is discharged to the fuel supply pipe 13 through the flexible tube (not shown), which is freely curved.

The pressure regulator 58 is located on the side of the fuel filter 54 in the pump unit 50 and connected to the fuel case 55. With this connection, a part of the fuel discharged from the fuel filter 54 to the fuel supply pipe 13 flows into the pressure regulator 58. The pressure regulator 58 discharges the excess fuel of the inflow fuel to the jet pump 21 thereby to regulate pressure of the fuel supplied to the fuel supply pipe 13.

As shown in FIG. 3, the residual level detector 60 is firmly fitted with the holder part 24 in the outside of the sub-tank 20. The residual level detector 60 is a sender gauge and electrically connected to the terminals 140 through flexible wires 61, which are freely curved. The residual level detector 60 has an arm 62, which rotates in correspondence to up-down movement of a float (not shown) floating on fuel in the fuel tank 2, and detects the level of residual fuel remaining in the fuel tank 2 in accordance with the angle of rotation of the arm 62. The residual level detector 60 outputs a detection signal indicating its detection result (Adjusting Mechanism)

Figure 4:
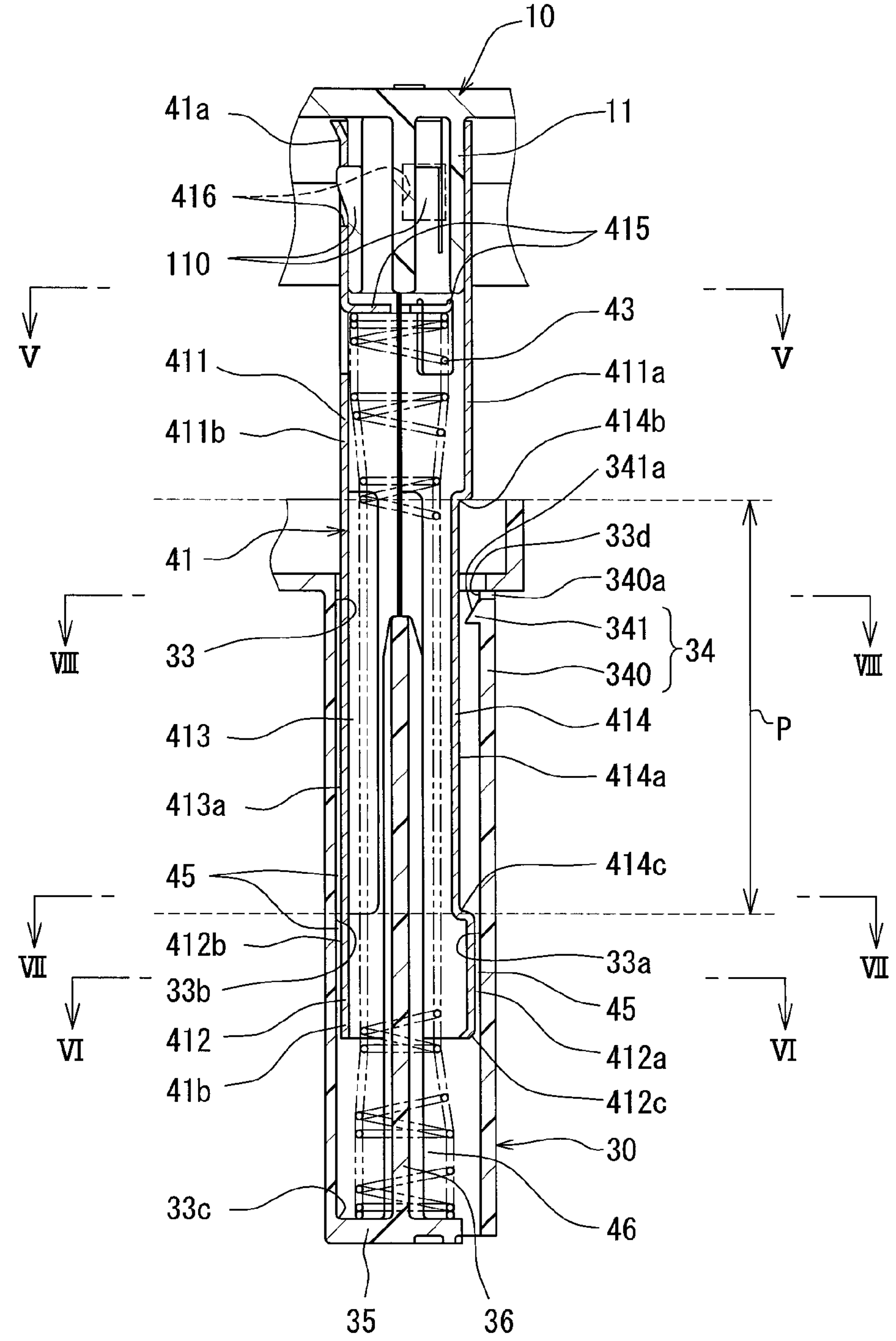
FIG. 4 is a sectional view showing a holder member and associated parts shown in FIG. 1 in an enlarged manner.

The adjusting mechanism 40 and the holder member 30, which cooperates with the adjusting mechanism 40, will be described in detail below. As shown in FIG. 4, the support column 41 has a longitudinal part between both axial ends 41*a* and 41*b* in the axial direction. This longitudinal part is set to have a specific range P, which is a predetermined length in the axial direction. In this support column 41, a top-side (upper-side) peripheral wall 411 and a bottom-side (lower-side) peripheral wall 412 are provided between both axial sides, which sandwich the specific range P in the axial direction. An intermediate peripheral wall 413 is provided over an entire range P between the peripheral walls 411 and 412.

Figure 5:
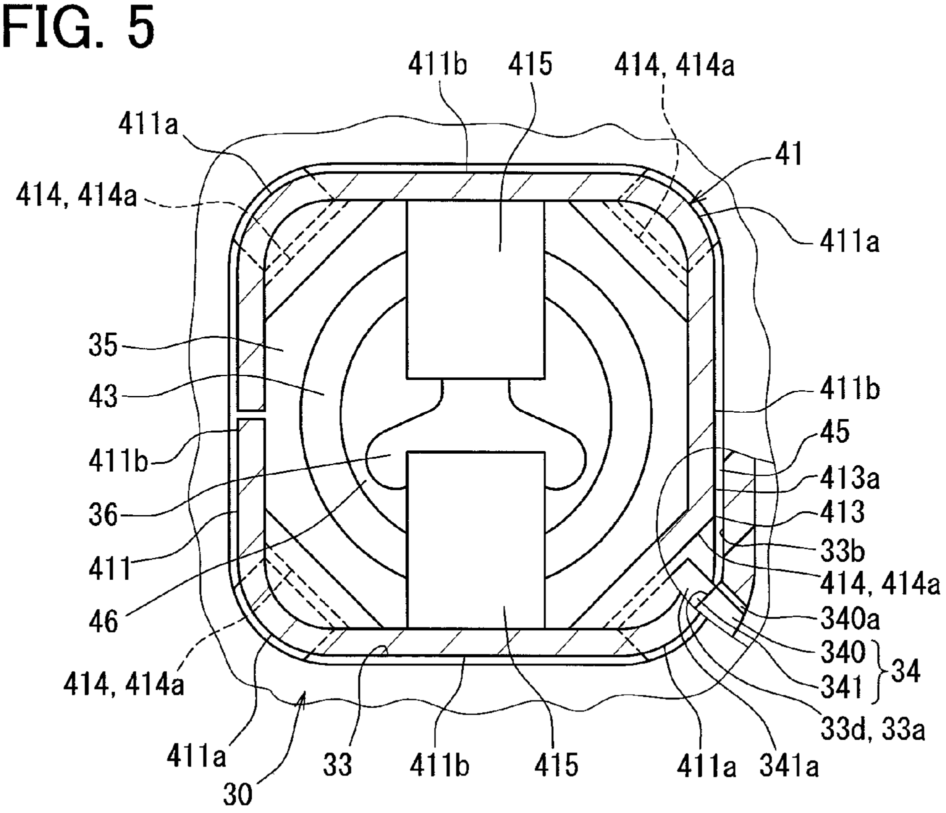
FIG. 5 is a sectional view of the holder member, which is taken along a line V-V in FIG. 4.

As shown in FIG. 4 and FIG. 5, the top-side peripheral wall 411 including a top end 41*a* has a shape of a square tube, which has four side surfaces 411*b* among four corner parts 411*a*. The peripheral wall 411 has top-side protrusions 415 and fixing holes 416 at a more top position than the specific range P. A part of the top-side peripheral wall 411 is bent in a shape of rectangular protrusion piece. Thus the top-side protrusions 415 protrude into the support column 41 in a radial direction from two locations of the peripheral wall 411. Each of the top-side protrusions 415 receives the top end of the resilient member 43. As shown in FIG. 4, the fixing holes 416 are formed to penetrate the top-side peripheral wall 411 in a shape of rectangular hole in the top end 41*a*, which is more top side than the top-side protrusion 415. Thus the fixing holes 416 are formed at two locations in the top-side peripheral wall 411. In each of the fixing holes 416, a fixing protrusion 110 formed on a fixing cylindrical part 11 of the flange 10 is snap-fitted. With this snap-fitting, the support column 41 is fitted firmly to the outside of the fixing cylindrical part 11 so that the support column 41 is restricted from disengaging in the downward direction.

Figure 6:
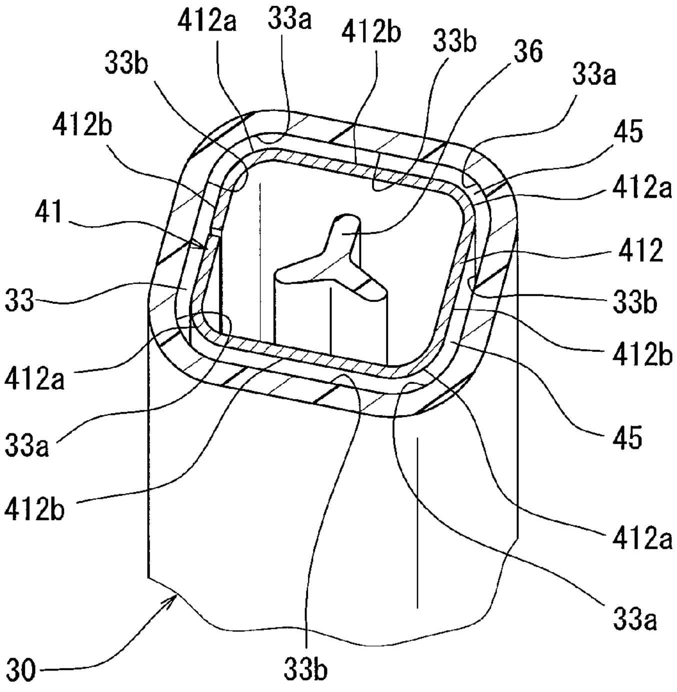
FIG. 6 is a perspective view of the holder member partially in section, which is taken along a line VI-VI in FIG. 4.

As shown in FIG. 4 and FIG. 6, the bottom-side peripheral wall 412 including the bottom end 41*b* has a shape of a square tube, which has four side surfaces 412*b* among four corner parts 412*a* and is coaxial with the top-side peripheral wall 411. Each of the corner parts 412*a* of the bottom-side peripheral wall 412 overlaps with either one of the corner parts 411*a* of the top-side peripheral wall 411 in the axial direction. Each of the corner parts 412*a* of the bottom-side peripheral wall 412 is fitted with either one of corner parts 33*a* of the accommodation hole 33, which has a square shape, with a fitting space (sliding space) 45 therebetween. With this fitting structure, each of the outside surfaces 412*b* of the bottom-side peripheral wall 412 is fitted with either one of inner-side surfaces 33*b* of the accommodation hole 33 with the fitting space 45 therebetween.

Figure 7:
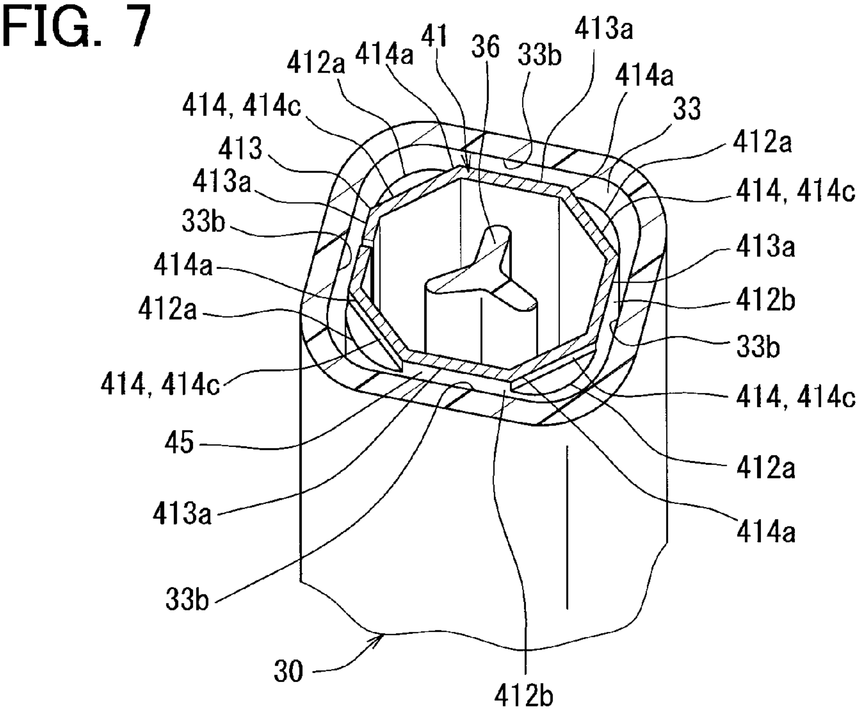
FIG. 7 is a perspective view of the holder member partially in section, which is taken along a line VII-VII in FIG. 4.

As shown in FIG. 4, FIG. 5 and FIG. 7, the intermediate peripheral wall 413 has four longitudinal grooves 414, which are concave from each of the corner parts 411*a* and 412*a* of the top-side peripheral wall 411 and the bottom-side peripheral wall 412. Thus the intermediate peripheral wall 413 has a shape of octangular tube, which is coaxial with the peripheral walls 411 and 412. In the intermediate peripheral wall 413, four outer side surfaces 413*a* between the longitudinal grooves 414 are formed to be flush with the outer side surfaces 411*b*, 412*b* of either one of the peripheral walls 411 and 412. With this flush surface structure, each of the outer side surfaces 413*a* of the intermediate peripheral wall 413 as well as each of the outer side surfaces 412*b* of the bottom-side peripheral wall 412 are fitted in either one of the inside surfaces 33*b* of the accommodation hole 33 with the fitting space 45 relative to the inside surface 33*b*.

As shown in FIG. 4, a top end 414*b*, which is one of both axial ends of each of the longitudinal grooves 414, is closed by either one of the corner parts 411*a* of the top-side peripheral wall 411 located axially outside the specific range P. Similarly, a bottom end 414*c*, which is the other of both axial ends of each of the longitudinal grooves 414, is closed by either one of the corner parts 412*a* of the bottom-side peripheral wall 412 located axially outside the specific range P (refer to FIG. 7 as well). With this closing structure, each of the longitudinal grooves 414 extends between the corner parts 411*a* and 412*a* in the axial direction so that the longitudinal groove 414 runs over an entire axial length of the specific range P.

As shown in FIG. 4, FIG. 5, FIG. 7 and FIG. 8, a groove bottom 414*a*, which is concave toward the inside of the support column 41 in the radial direction in each of the longitudinal grooves 414, separates the inside and the outside of the support column 41 in the axial direction over the entire area of the specified range P. With this separating structure, each longitudinal groove 414 provides a concave groove shape, which continuously extends in the axial direction in the specified range P.

Figure 9D:
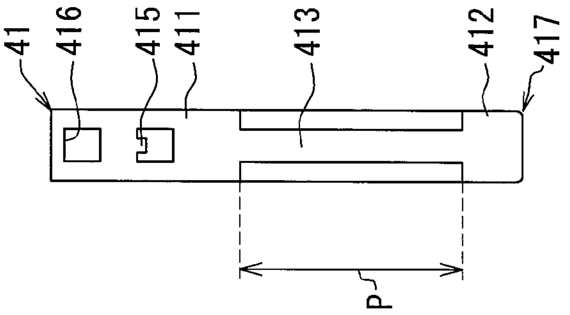
FIG. 9A to FIG. 9D are schematic views showing a manufacturing method for a support column shown in FIG. 4.
Figure 9C:
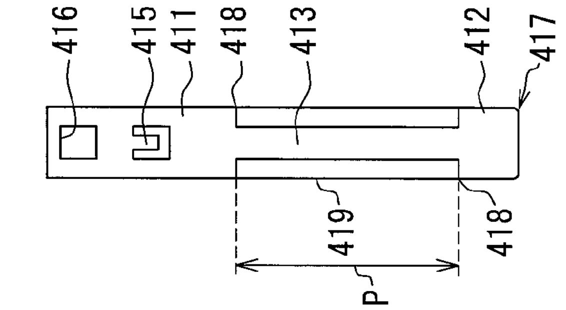
Figure 9B:
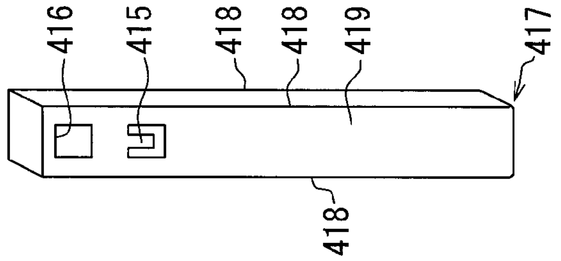
Figure 9A:
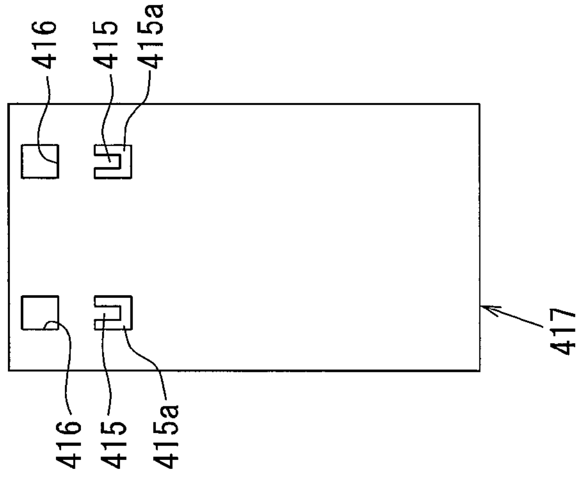

The support column 41 having the above-described structure is formed by sheet-metal forming, for example, as shown in FIG. 9A to FIG. 9D. As shown in FIG. 9A, a rectangle-shaped metal plate 417 having a pair of bendable U-shaped slits 415*a* for top-side protrusions 415 and a pair of fixing holes 416 are formed by shearing work such as punching. Then, as shown in FIG. 9B, the metal plate 417 is bent into a square tube by bending work using a punch or the like so that corner parts 418 are formed on peripheral walls 419 of the metal plate 417. The corner parts 418 will finally become corner parts 411*a* and 412*a* later.

As shown in FIG. 9C, the corner parts 418 within the specific range P of the peripheral wall is formed in a concave groove by reducing work using a die or the like so that an octangular peripheral wall 413 is formed between the peripheral walls 411 and 412 of the square tube shape. As shown in FIG. 9D, the top-side protrusion 415 of the peripheral wall 411, which is located at the more top side than the specific range P, that is, at a position higher than the specific range, is folded to protrude in a radially inward direction by folding work using a punch or the like so that the support column 41 is completed. The order of work processes shown in FIG. 9C and FIG. 9D may be exchanged or the work processes may be performed at the same time.

As shown in FIG. 4 and FIG. 5, the holder member 30 has a bottom-side protrusion 35, which protrudes from a bottom end 33*c* of the accommodation hole 33 to the inside of the hole 33 in the radial direction and is formed in a bottom plate shape. The bottom-side protrusion 35 is located at a more bottom side than the specific range P, that is, at a position lower than the specific range P, irrespective of the movement of the holder member 30 relative to the support column 41. The bottom-side protrusion 35 receives a bottom end of the resilient member 43 and sandwiches the resilient member 43 relative to the top-side protrusion 415. With this sandwiching structure, both axial ends of the resilient member 43 are located axially outside the specific range P at both top side and bottom side at any position of movement of the holder member 30 relative to the support column 41. Thus the resilient member 43 overlaps the entire axial length of the specific range P.

Figure 8:
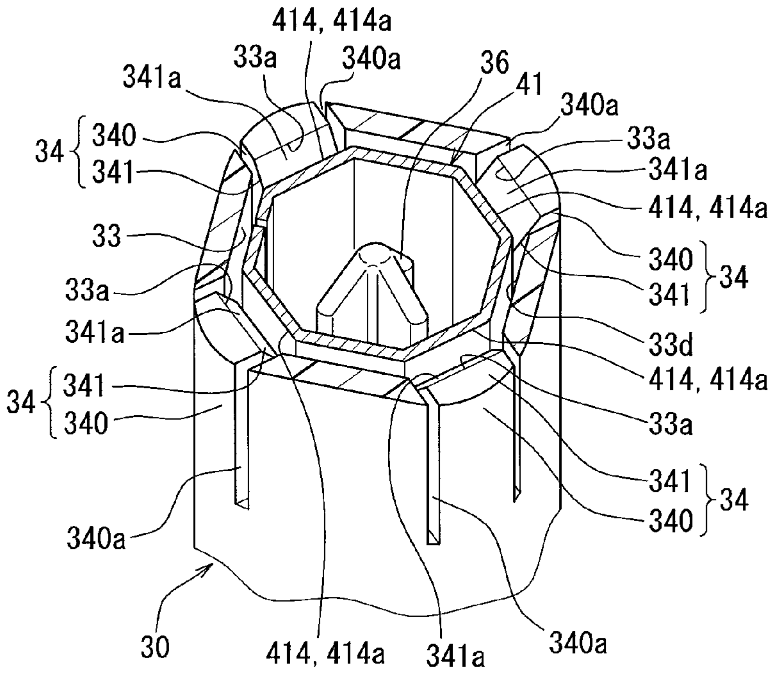
FIG. 8 is a perspective view of the holder member partially in section, which is taken along a line VIII-VIII in FIG. 4.

The holder member 30 has a guide protrusion 36, which extends upward in the axial direction from the bottom-side protrusion 35 and is formed in a tri-pronged shape in section (refer also to FIG. 6 to FIG. 8). The guide protrusion 36 is loosely inserted into an inner peripheral side of the resilient member 43, which is a coil spring, with a loose-inserting space 46 relative to the resilient member 43. With this insertion structure, the bottom-side protrusion 35 restricts the resilient member 43 from buckling while avoiding sliding on the resilient member 43.

As shown in FIG. 4, FIG. 5 and FIG. 8, the holder member 30 has slide protrusions 34 at four locations, which correspond to the longitudinal grooves 414 in number, in the top end 33*d* of the accommodation hole 33. Each slide protrusion 34 is provided in the accommodation hole 33 under a state that any one of the corner parts 33*a* is deformed in shape. The slide protrusion 34 has a resilient part 340 forming a corner part 33*a* and a nail part 341 protruding from the resilient part 340 into the accommodation hole 33. Here, since the holder member 30 has the U-shaped slit 340*a*, the resilient part 340 is resiliently deformable in the radially outward direction of the accommodation hole 33 with its bottom part as a fulcrum point. The nail part 341 protrudes in an acanthoid shape from the resilient part 340 forming the same slide protrusion 34 toward the radially inside of the hole 33. The height of protrusion of the nail part 341 is set to be smaller than the concave depth of the longitudinal groove 414. The nail part 341 has a slant face 341*a* at its top part. The nail part 341 inclines more toward the bottom side as it is at the more radially inside of the accommodation hole 33.

Each slide protrusion 34 is slidably movable in the longitudinal groove 414 in the axial direction with its nail part 341 being inserted in either one of the longitudinal grooves 414 of the intermediate peripheral wall 413. The nail part 341 is latched with the nearest corner part 411*a* of the top-side peripheral wall 411 when it reaches the top end 414*b* of the longitudinal groove 414. The nail part 341 is latched with the nearest corner part 412*a* of the bottom-side peripheral wall 412 when it reaches the bottom end 414*c* of the longitudinal grove 414. With this latching structure, the movement of the holder member 30 relative to the support column 41 is allowed only in the axial direction in the specific range P, in which the longitudinal grooves 414 are formed. With the proper setting of the height of protrusion, the nail part 341 is separated from the groove bottom 414*a* irrespective of the relative movement of the support column 41 to the holder member 30. Thus the nail part 341 is prevented from sliding in the longitudinal groove 414.

In the first embodiment, in which the number N of the peripheral walls 411, 412 of the support column 41 is 4, that is, the support column 41 is in a four-sided shape, the peripheral walls 411 and 412 sandwiching the specific range P in the axial direction form a tube of a polygonal cross-sectional shape having N corners in correspondence to the accommodation hole 33 having a polygonal cross-sectional hole having N corners. The peripheral wall 413 within the specific range P is concave relative to all the corner parts 411*a* and 412*a* of the peripheral walls 411 and 412. With this concave structure, the peripheral wall 413 forming the polygonal tube of 2N corners has N longitudinal grooves 414, in which the N slide protrusions 34 are protruded individually.

Figures 10A, 10B, 10C:
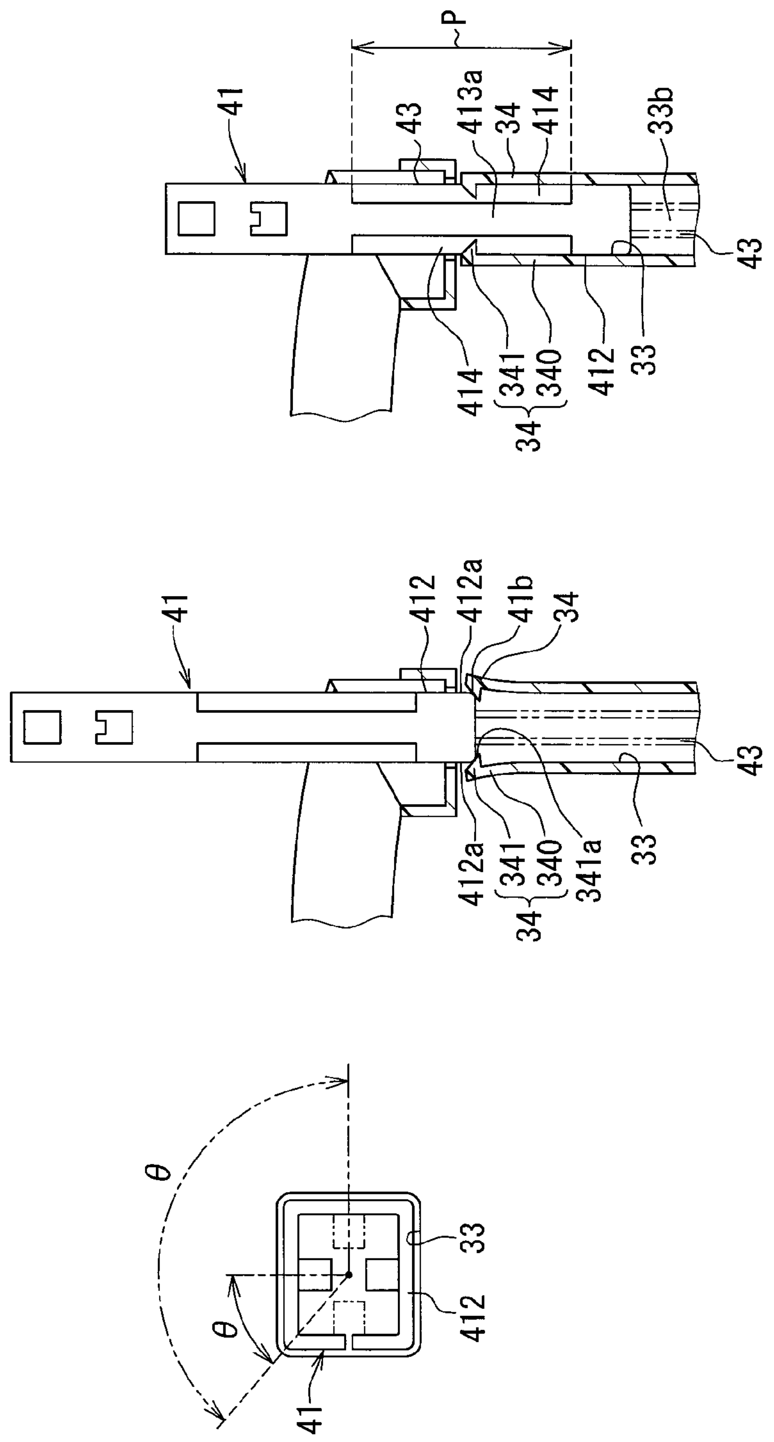
FIG. 10A to FIG. 10C are schematic views showing an assembling method of inserting the support column shown in FIG. 4 into an accommodation hole.

Here, an assembling work, in which the support column 41 is firmly fitted in the accommodation hole 33 with each slide protrusion 34 being inserted in each longitudinal groove 414 individually, is performed as shown in FIG. 10, for example. As shown in FIG. 10A, an angle θ of fitting the peripheral wall 412 relative to the accommodation hole 33 is adjusted under a state that the resilient member 43 is disposed to bridge the inside of the accommodation hole 33 and the inside of the support column 41 (refer to FIG. 10B and FIG. 10C). The fitting angle θ is adjustable over a span of 360/N degrees using the number N of corners. That is, it is adjustable in the peripheral direction over 90 degrees. In FIG. 10A, a two-dot chain line) (θ=135° shows a state that the fitting of the peripheral wall is shifted from the fitting angle shown by a solid line (θ=45°).

The, as shown in FIG. 10B, the nail part 341 of each slide protrusion 34 is pressed at the corner part 412*a* of either one of the bottom-side peripheral walls 412 so that the resilient part 340 of each slide protrusion 34 is resiliently deformed or expanded in the radially outward direction of the accommodation hole 33. In this case, the slant face 412*c* (refer to FIG. 4), which inclines more in the upward direction at a position more radially outward of the bottom end 41*b* in each corner part, is pressed to the slant face 341*a* of the corresponding nail part 341. With this pressing, it is prevented that the support column 41 made of metal cuts into the nail part 341 made of resin and the resilient part 340 becomes incapable of deforming resiliently.

Finally, as shown in FIG. 10C, either one of the outside surface 413*a* of the intermediate peripheral wall 413 is firmly fitted into the inside surface 33*b* of the accommodation hole 33 so that the nail part 341 of each slide protrusion 34 reaches the specific range P of the support column 41. With this reach, the resilient part 340 of each slide protrusion 34 resiliently flexes in the radially inner direction of the accommodation hole 33 to restore its original shape. The nail part 341 of each slide protrusion 34 fits into either one of the longitudinal grooves 414 of the intermediate wall 413. The assembling is thus completed.

(Operation and Advantage)

The operation and advantage of the first embodiment described above will be described below.

In the support column 41 having the polygonal tube shape, the peripheral wall 413 in the specific range P, which is a part in the axial direction, is concave from the corner parts 411*a* and 412*a* of the peripheral walls 411 and 412, which are outside the specific range P. Thus the longitudinal groove 414 is formed so that the slide protrusion 34 of the holder member 30 slides and moves while the slide protrusion 34 is fitted. The holder member 30 is allowed to move relatively to the support column 41 in the axial direction in the specific range P. As a result, the pump unit 50 held by the holder member 30 is pressed by the resilient member 43 provided in the support column 41 through the holder member 30 so that the pump unit 50 is placed in position in the axial direction relative to the bottom part 2*c* of the fuel tank 2. With the support column 41 having the polygonal tube shape, in which the peripheral walls 412 and 413 are firmly fitted in the accommodation hole 33 having the similar polygonal hole shape, the pump unit 50 is capable of being placed in position in the peripheral direction as well in accordance with the fitting angle θ of the peripheral walls 412 and 413. In addition, the groove bottom 414*a* of the longitudinal groove 414, which radially separates the inside and the outside of the support column 41, prevents the slide protrusion 34 from entering into the longitudinal groove 414 from the outside of the support column 41 and interfering the resilient member 43 in the support column 41 irrespective of vibration of a vehicle. For this reason, it is possible to avoid that such interference varies the pressing force of the resilient member 43 and makes the positioning in the axial direction more difficult.

The corner parts 411*a* and 412*a*, which are outside the specific range P and close both axial ends 414*b* and 414*c* of the longitudinal groove 414 by the peripheral walls 411 and 412, latch the slide protrusion 34, which reaches the nearest one of the ends 414*b* and 414*c*. The slide protrusion 34, which is latched at both axial ends 414*b* and 414*c*, is restricted from disengagement from the longitudinal groove 414.

Here, the support column 41 is formed in a 2N-sided polygonal tube shape, in which the peripheral wall 13 is concave at both ends of the specific range P relative to all the corner parts 411*a* and 412*a* of the peripheral walls 411 and 412 having the N-sided polygonal tube shape corresponding to the accommodation hole 33. This support column 41 provides N longitudinal grooves 414, which are closed at both ends. All the slide protrusions 34, which individually protrude into the closed longitudinal grooves 414, are restricted from disengaging from the longitudinal grooves 414 surely by the corner parts 411*a* and 412*a* provided at both axial ends. It is thus possible to maintain positioning of the pump unit 50 in the axial direction for a long time.

The resilient member 43, which is sandwiched between the top-side protrusion 415 protruding into the support column 41 at the more top side than the specific range P and the bottom-side protrusion 35 protruding into the accommodation hole 33 at the more bottom side than the specific range P, overlaps the entire area of the specific range P in the axial direction. It is thus possible in the longitudinal groove 414, which overlaps the resilient member 43 over the entire range in the axial direction, to prevent the slide protrusion 34 and the resilient member 43 from interfering by the groove bottom 414*a* even in a case that the slide protrusion 34 enters at axially different positions. As a result, it is made possible to avoid with high reliability that the interference of the slide protrusion 34 with the resilient member 43 degrades positioning in the axial direction.

Further, both of the longitudinal groove 414 formed in the concave groove shape on the peripheral wall 413 in the specific range P and the top-side protrusion 415 formed by folding the peripheral wall 411, which is at the more top side than the specific range P, into the protruded piece, can be formed readily by sheet-metal working on the metal plate 417 of the polygonal tube shape. The fuel supply device 1 can be provided with not only high reliability of avoiding the degradation of positioning in the axial direction but also high productivity.

Since the accommodation hole 33 is fitted with the peripheral walls 412 and 413 with the fitting space 45 therebetween, the fitting work can be simplified while absorbing manufacturing tolerance of the column 45 or the holder member 30.

In the first embodiment, the top-side peripheral wall 411 and the bottom-side peripheral wall 412 form a first peripheral wall and the intermediate peripheral wall 413 form a second peripheral wall.

Second Embodiment

Figure 11:
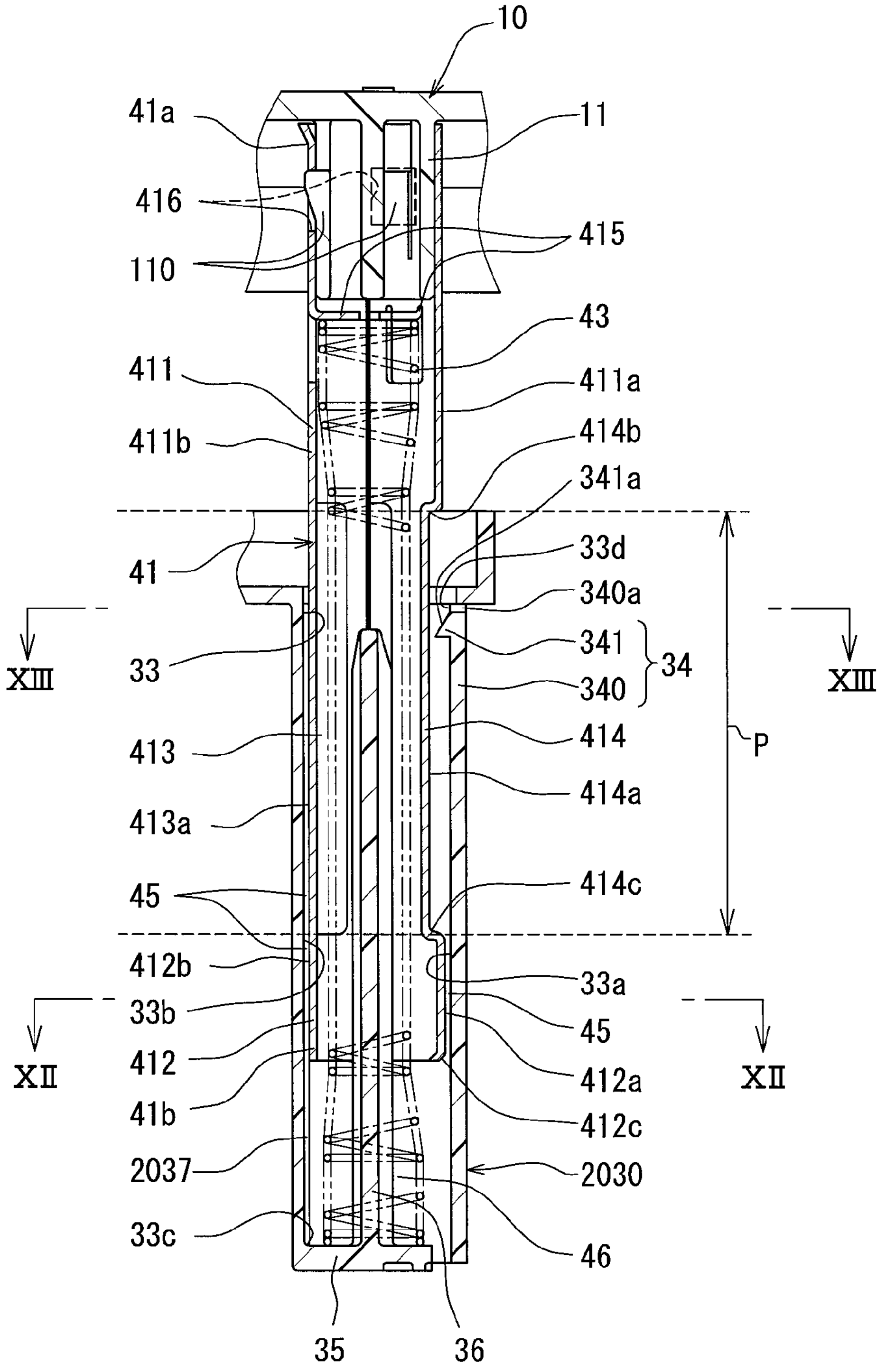
FIG. 11 is a sectional view showing a holder member and associated parts of a fuel supply device according to a second embodiment.
Figure 12:
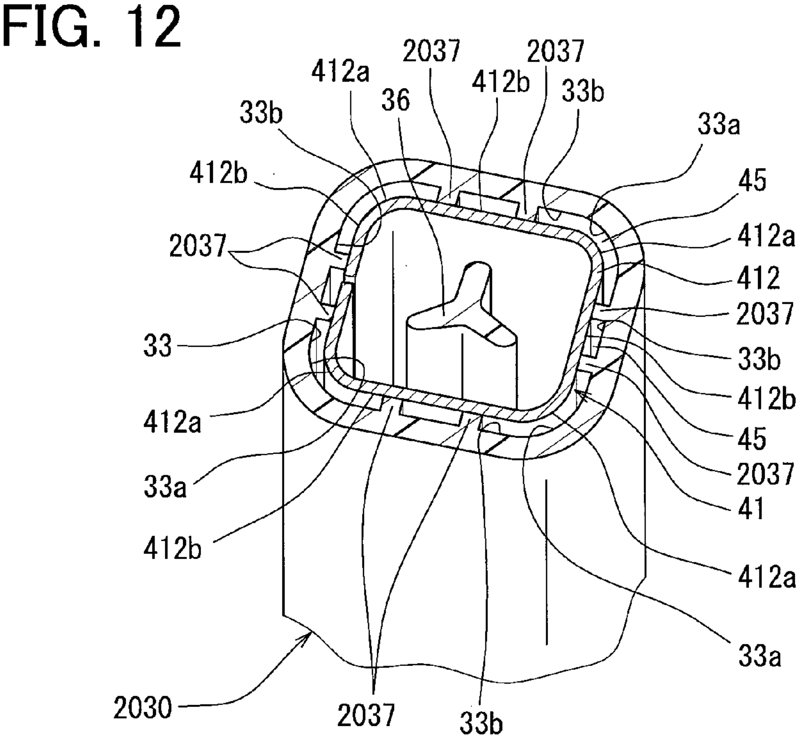
FIG. 12 is a sectional view of the holder member, which is taken along a line XIII-XIII in FIG. 11.
Figure 13:
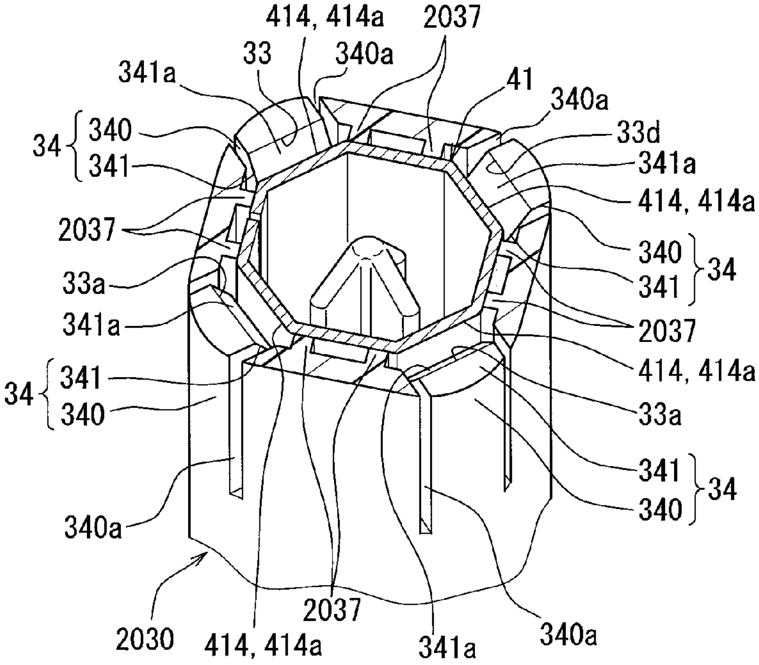
FIG. 13 is a perspective view of the holder member partially in section, which is taken along a line XIII-XIII in FIG. 11.

As shown in FIG. 11 to FIG. 13, a second embodiment is a modification of the first embodiment.

In the second embodiment, a holder member 2030 further has plural positioning ribs 2037, which protrude into the accommodation hole 33. Two positioning ribs 2037 are formed to extend in the axial direction on each inside surface 33*b* of the accommodation hole 33. A total of 2N, that is, 8, ribs 2037 are provided in the accommodation hole 33. Each positioning rib 2037 has a generally rectangular cross-sectional shape and has a height of protrusion so that it slidably contacts the outside surfaces 412*b* and 413*a* of the peripheral walls 412 and 413 in the axial direction. Fitting spaces 45 are provided between the peripheral walls 412 and 413 and the inside surface 33*b*, from which the positioning ribs 2037 protrude. Further, each positioning rib 2037 is formed over the entire length in the axial direction of the accommodation hole 33. The positioning rib 2037 thus slidably contacts either one of the outside surfaces 412*a* and 413*a* at an arbitrary position of relative movement of the holder member 2030 relative to the support column 41.

The second embodiment described above provides the similar operation and advantage as the first embodiment. In addition, the positioning ribs 2037 of the holder member 2030 protruding into the accommodation hole 33 slidingly contact the support column 41 in the axial direction. As a result, even with the fitting space 45 for absorbing the manufacturing tolerance, rattling of the column 41 in the accommodation hole 33 is reduced. Thus the positioning in the peripheral direction corresponding to the fitting angle θ against the pump unit 50 is realized surely. The fuel supply device 1 can be provided with not only high reliability of avoiding the degradation of positioning in the axial direction but also high productivity.

Other Embodiment

The fuel supply device 1 is described with reference to plural embodiments. However, the fuel supply device 1 is not limited to such embodiments but may be implemented differently as other embodiments and applied to various combinations of embodiments.

Figure 14:
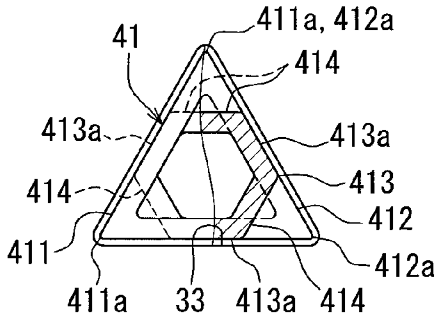
FIG. 14 is a perspective view of a modified example of the first embodiment.

In a first modification of the first embodiment and the second embodiment, in which the peripheral walls 411 and 412 forming the N-sided polygonal tube are formed outside the specific range P and the peripheral wall 413 forming the 2N-sided polygonal tube are formed inside the specific range P relative to the N-sided polygonal accommodation hole 33, the number N may be an integer, which is 3, 5 or greater than 5 as shown in FIG. 14. Here, FIG. 14 shows a hexagonal tubular peripheral wall 413, in which three outside surfaces 413*a* are formed among three longitudinal grooves 414, by changing the Number N to 3 in the first embodiment.

Figure 15:
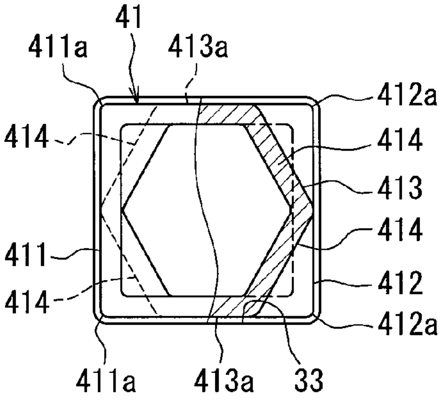
FIG. 15 is a perspective view of a modified example of the first embodiment.

In a second modification of the first embodiment and the second embodiment, as shown in FIG. 15 to FIG. 19, the peripheral wall 413 may be formed in a shape other than the 2N-sided polygonal tube in the specific range P relative to the N-sided polygonal accommodation hole 33, although the peripheral walls 411 and 412 are formed in the N-side polygonal tube shape outside the specific range P. Here, FIG. 15 shows that the peripheral wall 413 is concave relative to all corner parts 411*a* and 412*a* of the peripheral walls 411 and 412 of the square tube shape of the first embodiment. Thus, the peripheral wall 413 forms a hexagonal tube shape so that four longitudinal grooves 414 are formed.

Figure 16:
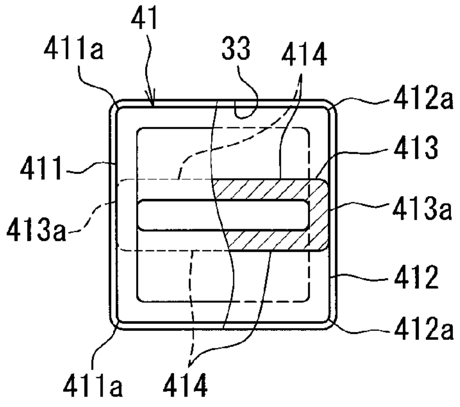
FIG. 16 is a perspective view of a modified example of the first embodiment.
Figure 17:
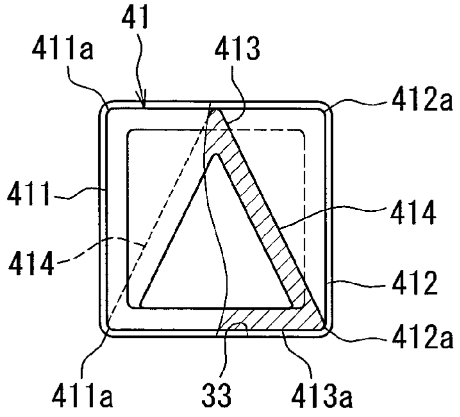
FIG. 17 is a perspective view of a modified example of the first embodiment.

FIG. 16 shows that the peripheral wall 413 is concave relative to all corner parts 411*a* and 412*a* of the peripheral walls 411 and 412 of the square tube shape of the first embodiment. Thus, the peripheral wall 413 forms the square tube shape so that two outside surfaces 413*a* are formed between two longitudinal grooves 414. FIG. 17 shows that the peripheral wall 413 is concave relative to every two corner parts 411*a* and 412*a* of the peripheral walls 411 and 412 of the square tube shape of the first embodiment. Thus, the peripheral wall 413 forms the triangular tube shape so that one outside surface 413*a* is formed between two longitudinal grooves 414, which are adjacent in the peripheral direction.

Figure 18:
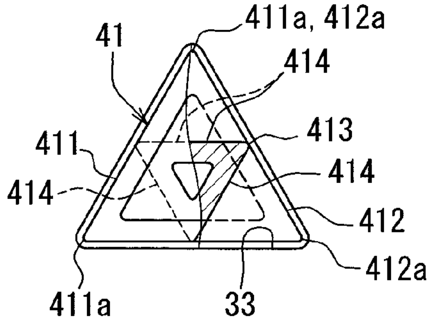
FIG. 18 is a perspective view of a modified example of the first embodiment.
Figure 19:
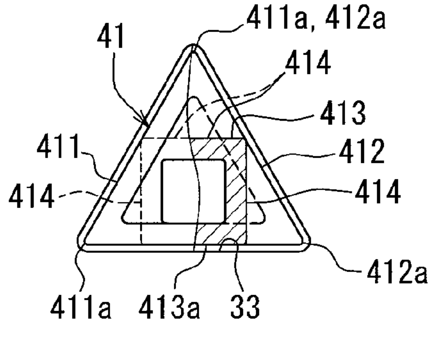
FIG. 19 is a perspective view of a modified example of the first embodiment.

FIG. 18 and FIG. 19 show another modification of the first embodiment, to which the first modification and the second modification are added. That is, FIG. 18 shows that the peripheral wall 413 is concave relative to all corner parts 411*a* and 412*a* of the peripheral walls 411 and 412 of the triangular tube shape of the first modification. Thus, the peripheral wall 413 forms a triangular tube shape so that three longitudinal grooves 414 are formed adjacently in the peripheral direction. FIG. 19 shows that the peripheral wall 413 is concave relative to all corner parts 411*a* and 412*a* of the peripheral walls 411 and 412 of the triangular tube shape of the first modification. Thus, the peripheral wall 413 forms a square tube shape so that the outside surface 413*a* is formed between the two longitudinal grooves 414.

In the third modification of the first embodiment and the second embodiment, the fixed cylindrical tube part 11 may be configured to receive the resilient member 43, for example, without providing the top-side protrusion 415 on the support column 41. In the fourth modification of the first embodiment and the second embodiment, one end of the longitudinal groove 414 may be opened without forming either one of the peripheral walls 411 and 412. In the fifth modification of the first embodiment and the second embodiment, the support column 41 of the polygonal tube shape may be formed by other sheet-metal forming such as deep drawing, forging or extrusion without being limited to the plural steps of sheet-metal forming shown in FIG. 9.

In the sixth modification of the first embodiment and the second embodiment, one of the bottom-side peripheral wall 412 and the intermediate peripheral wall 413 may be loosely inserted relative to the accommodation hole 33 rather than being fitted. In the seventh modification of the first embodiment and the second embodiment, the top-side peripheral wall 411 may be fitted in the accommodation hole 33 with the fitting space 45 in addition to the bottom-side peripheral wall 412 and the intermediate peripheral wall 413 or in place of one or both of the peripheral walls 412 and 413.

As an eighth modification of the second embodiment, the number of bars of the ribs 2037 may be any integer other than 2N. As a ninth modification of the second embodiment, the rib 2037 may be formed only partly in the axial direction of the accommodation hole 33.

What is claimed is:

1. A fuel supply device comprising:

a flange mounted on a fuel tank of a vehicle;

a pump unit disposed in the fuel tank for discharging fuel toward an outside of the fuel tank;

a holder member holding the pump unit;

a single support column extending from the flange and connecting the flange and the pump unit, the single support column being movable relative to the holder member in an axial direction; and a resilient member accommodated in the single support column and pressing the pump unit toward a bottom part of the fuel tank in the axial direction through the holder member, wherein the single support column is formed in a polygonal tube shape, the single support column has a top-side peripheral wall, a bottom-side peripheral wall, and an intermediate peripheral wall, the top-side peripheral wall and the bottom-side peripheral wall are between both axial ends of the single support column, the intermediate peripheral wall is sandwiched between the top-side peripheral wall and the bottom-side peripheral wall in the axial direction, the top-side peripheral wall and the bottom-side peripheral wall each are formed with corner parts outside of the intermediate peripheral wall, and the intermediate peripheral wall has a length in the axial direction, the intermediate peripheral wall is concave to form a longitudinal groove having a groove bottom, and wherein the holder member is formed to have a polygonal hole shape to be fitted with at least one of the top-side peripheral wall, the bottom-side peripheral wall, and the intermediate peripheral wall and has an accommodation hole and a slide protrusion, the accommodation hole accommodating the single support column relatively movably in the axial direction, and the slide protrusion being movable to slide in the longitudinal groove in a state of entering from an outside of the single support column into the longitudinal groove.

2. The fuel supply device according to claim 1, wherein:

both axial ends of the longitudinal groove are blocked by the corner parts of the top-side peripheral wall and the bottom-side peripheral wall.

3. The fuel supply device according to claim 2, wherein:

assuming that N is an integer equal to or larger than 3, the top-side peripheral wall and the bottom-side peripheral wall form a N-sided polygonal tube shape at both sides sandwiching the intermediate peripheral wall in the axial direction, the N-sided polygonal tube shape corresponding to the accommodation hole of the polygonal hole shape of N side surfaces;

the intermediate peripheral wall is concave relative to all the corner parts of the N-sided polygonal tube shape to form N longitudinal grooves, so that the intermediate peripheral wall form 2N-sided polygonal tube shape; and the slide protrusion is formed at N positions in the accommodation hole to enter into each longitudinal groove individually.

4. The fuel supply device according to claim 1, wherein:

the holder member has a bottom-side protrusion protruding into the accommodation hole at a more bottom side than the intermediate peripheral wall; and the single support column has a top-side protrusion to sandwich the resilient member against the bottom-side protrusion by protruding into the support column at a more top side than the intermediate peripheral wall.

5. The fuel supply device according to claim 4, wherein:

the single support column is formed of a metal plate in the polygonal tube shape;

the intermediate peripheral wall is formed in a concave groove shape to provide the longitudinal groove in the metal plate; and the top-side peripheral wall provided at the more top side than the intermediate peripheral wall in the metal plate is bent in a protruded tongue shape to provide the top-side protrusion.

6. The fuel supply device according to claim 1, wherein:

the accommodation hole is fitted with at least one of the top-side peripheral wall, the bottom-side peripheral wall, and the intermediate peripheral wall with a fitting space; and the holder member has a positioning rib protruding into the accommodation hole and sliding the single support column in the axial direction.

* * * * *